United States Patent [19]
Dale, Jr.

[11] Patent Number: 5,218,556
[45] Date of Patent: Jun. 8, 1993

[54] STEERING PIVOT AXIS ORIENTATION MEASUREMENT APPARATUS AND METHOD

[75] Inventor: James L. Dale, Jr., Conway, Ark.
[73] Assignee: FMC Corporation, Chicago, Ill.
[21] Appl. No.: 632,903
[22] Filed: Dec. 24, 1990
[51] Int. Cl.⁵ .................................................. G06F 15/20
[52] U.S. Cl. ................................. 364/559; 33/203.18
[58] Field of Search .............. 364/559, 551.01, 424.05; 33/203, 203.18, 203.19, 286, 288, 336; 356/155

[56] References Cited

U.S. PATENT DOCUMENTS

| | | | |
|---|---|---|---|
| 4,249,824 | 2/1981 | Wiederrich et al. | 356/155 |
| 4,615,618 | 10/1986 | Bailey et al. | 33/203.18 |
| 4,761,749 | 8/1988 | Titsworth et al. | 364/559 |
| 4,823,470 | 4/1989 | Hörvallius | 356/155 |
| 4,854,702 | 8/1989 | Stieff | 356/155 |
| 4,918,821 | 4/1990 | Bjork | 356/155 |
| 4,931,964 | 6/1990 | Titsworth et al. | 364/559 |
| 4,942,666 | 7/1990 | Wickmann et al. | 33/203.18 |
| 5,014,227 | 5/1991 | Kling et al. | 364/559 |

*Primary Examiner*—Parshotam S. Lall
*Assistant Examiner*—Michael Zanelli
*Attorney, Agent, or Firm*—H. M. Stanley; R. C. Kamp; R. B. Megley

[57] ABSTRACT

The disclosure herein relates to apparatus and method for finding the orientation of a steering pivot axis for a wheel in a pair of steerable wheels in a vehicle suspension system, wherein arbitrary steering directions are imparted to the wheels and measurements are taken of the steering directions and the other steerable wheel alignment characteristics of interest. The measurements are transmitted to a computer which serves to calculate caster, steering axis inclination and the orientation of the steering pivot axis relative to a defined three dimensional alignment coordinate system.

17 Claims, 2 Drawing Sheets

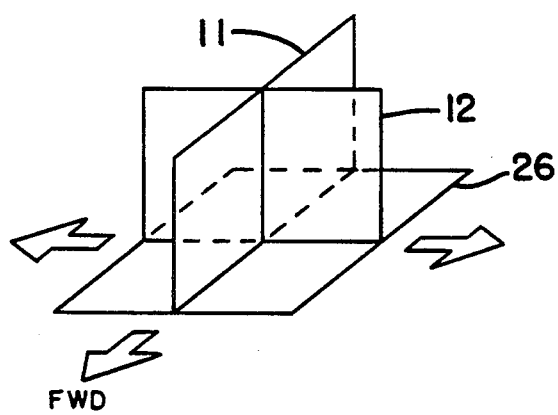
FIG_1
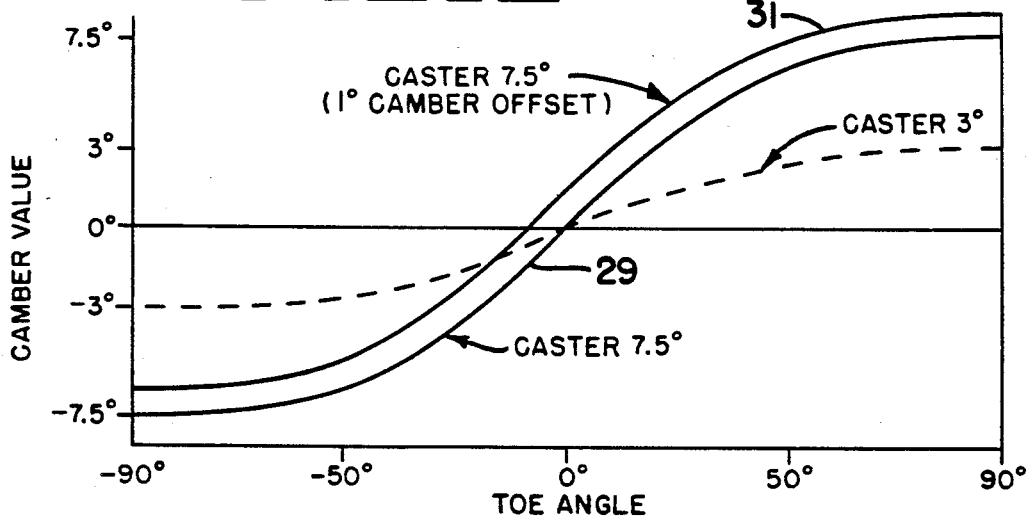
FIG_2
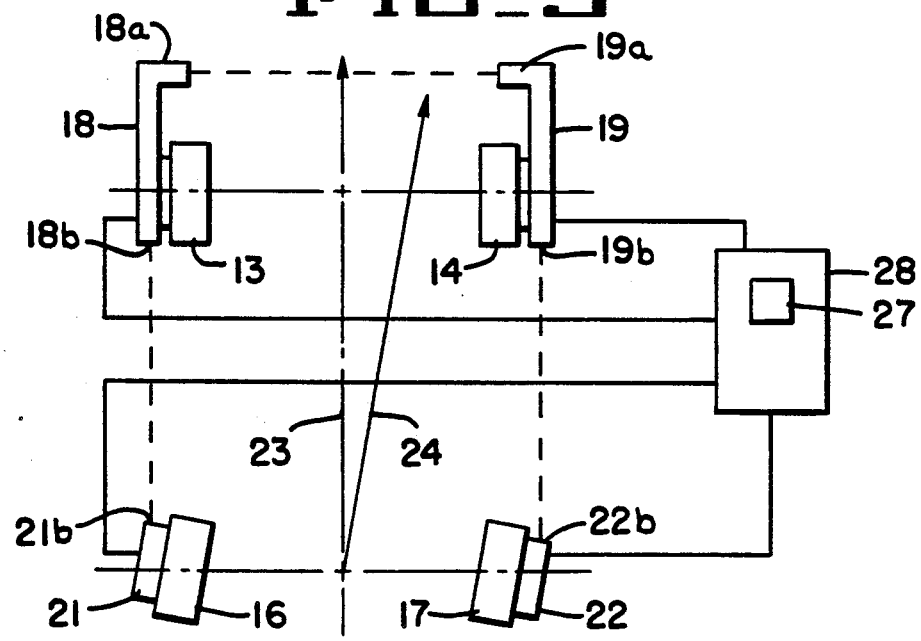
FIG_3

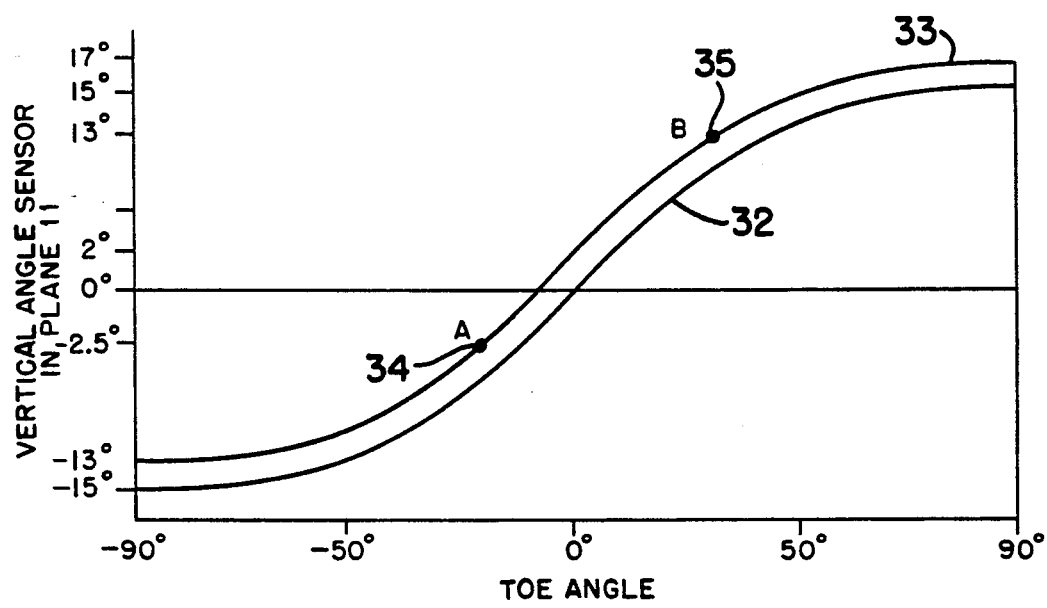

5,218,556

STEERING PIVOT AXIS ORIENTATION MEASUREMENT APPARATUS AND METHOD

SUMMARY OF THE INVENTION

The invention herein relates to use by an operator of a wheel alignment system for a method for measuring orientation characteristics of a steering pivot axis for steerable wheels in a vehicle suspension system including the steps of steering the steerable wheel in a first operator selected direction, measuring the angle of at least one of the pair of steerable wheels in the first operator selected arbitrary direction relative to a straight ahead steering direction, and measuring the angle of the at least one steerable wheel in the first operator selected arbitrary direction relative to vertical. Further, the steps are included of steering the steerable wheels in a second operator selected arbitrary direction, measuring the angle of the at least one steerable wheel in the second operator selected arbitrary direction relative to the straight ahead direction, measuring the angle of the at least one wheel in the second operator selected arbitrary direction relative to vertical, and determining the steering pivot axis orientation characteristics using the measured angles obtained in the first and second operator selected arbitrary steering directions.

In another aspect of the invention to be employed by an operator of a wheel alignment system is provided for measuring orientation characteristics of a steering pivot axis for either of a pair of steerable wheels in a vehicle suspension system including the steps of steering the pair of steerable wheels in a straight ahead direction, measuring the inclination angle of one of the pair of steerable wheels relative to the vertical while steered in the straight ahead direction, and measuring the toe angle of one of the pair of steerable wheels, also while steered in the straight ahead direction. Further, the method includes the steps of steering the pair of steerable wheels in an operator selected arbitrary direction which is distinct from the straight ahead direction, measuring the toe angle of the one of the pair of steerable wheels while steered in the operator selected arbitrary direction, measuring the inclination angle of the one of the pair of steerable wheels relative to vertical while steered in the operator selected arbitrary direction, and determining the steering pivot axis orientation characteristics of the one of the pair of steerable wheels from the aforesaid wheel toe and inclination angle measurements.

The inventive apparatus is for use by a wheel alignment system operator for measuring the orientation characteristics of a steering pivot axis for either of a pair of steerable wheels in a vehicle suspension system which includes means for measuring individual toe angle for the pair of steerable wheels and means for measuring camber inclination angles for one of the pair of steerable wheels. The apparatus also includes calculation means for receiving measurements at two operator selected arbitrary steering angles of toe angle and camber angle and for providing caster angle indication.

In yet another aspect of the invention apparatus or use by an operator of a wheel alignment system is provided for measuring the orientation characteristics of a steering pivot axis for one of the pair of steerable wheels in a vehicle suspension system, which includes means for measuring individual toe angle for one of the pair of steerable wheels and means for measuring caster inclination angles for the one of the pair of steerable wheels. Further, the apparatus includes calculation means for receiving the toe angle and caster angle measurements at two operator selected arbitrary wheel pair steering angles and for providing steering axis inclination indication.

The invention further relates to a method for use by an operator of a wheel alignment system for measurement of caster angle of a steerable wheel in a wheel suspension system, which includes the steps of steering the steerable wheel in a first operator selected arbitrary direction, measuring the angle of the steerable wheel in the camber plane relative to vertical in the first operator selected arbitrary direction, measuring the angle of the steerable wheel relative to a straight ahead steering direction in the first operator selected arbitrary direction, and steering the steerable wheel in a second operator selected arbitrary direction. The method further includes the steps of measuring the angle of the steerable wheel in the camber plane relative to vertical in the second operator selected arbitrary direction, measuring the angle of the steerable wheel relative to the straight ahead steering direction in the second operator selected arbitrary direction, and calculating the caster angle of the steerable wheel by using only the measured angles of the steerable wheel relative to vertical and straight ahead steering direction in the first and second operator selected arbitrary directions.

The invention herein also relates to a method for use by an operator of a wheel alignment system for measurement of steering axis inclination angle of a steerable wheel in a vehicle suspension system, which includes the steps of steering the steerable wheel in a first operator selected arbitrary direction, measuring the angle of the steerable wheel in the caster plane relative to vertical in the first operator selected arbitrary direction, and measuring the angle of the steerable wheel relative to a straight ahead direction in the first operator selected arbitrary direction. Additionally, the steps are included of steering the steerable wheel in a second operator selected arbitrary direction, measuring the angle of the steerable wheel in the caster plane relative to vertical in the second operator selected arbitrary direction, measuring the angle of the steerable wheel relative to the straight ahead direction in the second operator selected arbitrary direction, and calculating the steering axis inclination angle of the steerable wheel by using only the measured angles of the steerable wheel relative to vertical and a straight ahead steering direction in the first and second operator selected arbitrary directions.

BRIEF DESCRIPTION OF THE DRAWINGS

FIG. 1 is a perspective view of the three dimensional alignment plane arrangement for orientation reference of the wheels in a vehicle suspension system.

FIG. 2 is a graph showing the relationship between toe angle, camber value and caster value for explanation of the present invention.

FIG. 3 is a plan view showing four wheels in a vehicle suspension system and an exemplary alignment system mounted thereon for explanation of the present invention.

FIG. 4 is a graph showing the relationship between SAI angle, toe angle and the angle departure from vertical measured by the inclinometer sensitive to motion in caster plane 11.

DESCRIPTION OF THE PREFERRED EMBODIMENTS

For vehicle suspension measurement purposes, the pivot axis of each of the pair of steerable wheels is projected into two orthogonal planes. With reference to FIG. 1, three orthogonally oriented planes are shown wherein a caster plane 11 extends in a fore and aft or longitudinal direction aligned with the indication "forward" as seen in FIG. 1. A camber plane 12 is oriented perpendicular to the caster plane and both planes extend in vertical directions. One of the projections of the steerable wheel pivot axis is called caster and is projected onto the caster plane 11 exhibiting, in the usual case, some angle of departure from parallelism with the camber plane 12. The other projection of the steerable wheel pivot axis is on the camber plane 12, exhibiting some angle of departure from the caster plane 11 and being called the steering axis inclination (SAI). It may be seen that the caster projection is seen when viewed from the side of the vehicle and the SAI projection is seen when viewed from the front of the vehicle. To measure these pivot angles it is usual practice to pivot the suspension, or the steerable front wheels, about their steering axes. By the use of instruments, attitude of each of the front wheels with respect to gravity is measured at two different steering directions. From these measurements data is obtained from which the orientation of the steering pivot axis in space may be obtained.

FIG. 3 is a plan depiction of an exemplary wheel alignment system mounted on a four-wheel vehicle suspension. The vehicle alignment system may be such as the system disclosed in U.S. Pat. No. 4,761,749, issued Aug. 2, 1988 and U.S. Pat. No. 4,931,964, issued Jun. 5, 1990, assigned to FMC Corporation, the assignee of the invention disclosed herein. As shown in FIG. 3, the pertinent portions of such an alignment system are mounted on a pair of steerable front wheels 13 and 14, and a pair of rear wheels 16 and 17. An alignment head 18 is mounted on the left steerable wheel 13 and contains a cross toe measurement portion 18a, as well as including a pair of orthogonally oriented inclinometers for providing camber and caster readings and SAI readings. The camber and caster readings are obtained from the inclinometer oriented for sensitivity to motion in the camber plane 12. The SAI readings are taken from the inclinometer which is sensitive to motion in the caster plane 11. A similar alignment head 19 is shown mounted on the right steerable wheel 14, also having a cross toe measurement section 19a and a pair of orthogonally oriented inclinometers as described for alignment head 18. Alignment heads 21 and 22 are mounted on the rear wheels 16 and 17 respectively in optical (or mechanical) communication with the front steerable wheel mounted heads 18 and 19 as shown. The steerable front wheels 13 and 14 may be aligned with reference to the centerline 23 of the chassis suspended on the four-wheel system shown in FIG. 3 or they may be aligned with respect to a thrustline 24 defined by the toe of the rear wheels 16 and 17. Centerline or thrustline reference for the alignment of the front wheels 13 and 14 is explained together with the attendant advantages and disadvantages in the disclosures of the aforementioned two U.S. patents herein.

Turning again to FIG. 1, a plane 26 is shown oriented orthogonally to planes 11 and 12 and therefore in a horizontal attitude. The plane 26 is the plane in which the toe of the vehicle suspension wheels is measured, and in particular is the plane in which the toe angles of the steerable wheels 13 and 14 of FIG. 3 are measured by means of the toe sensors 18a, 19a, 18b, 21b, 19b and 22b in the alignment heads of FIG. 3.

In the past, reference was made to a pair of steerable wheel turn angles for obtaining steering pivot axis orientation measurements (usually plus/minus 10 or plus/minus 15 degrees). These angles were indicated by scales, turn plates, or optical or mechanical toe sensors, for example. The operator was required to position the steerable wheels as accurately as possible to match these predetermined turning angles. When one steerable wheel was at the predetermined plus turn angle, data was taken for that one wheel. Often both wheels could not be placed at the turn angle simultaneously. Consequently, the second wheel would then have to be repositioned at the predetermined turn angle. Subsequently, the wheels were steered to the minus or second predetermined turn angle as indicated by the sensors and data was taken from one of the steerable wheels. The other steerable wheel then was accurately positioned at the minus or second turn angle and data taken for that steerable wheel. The data was obtained from the aforementioned inclinometer for caster readings in the camber reference plane 12 and the SAI readings in plane 11 as mentioned hereinbefore. The predetermined turn angles (i.e., plus/minus 10 degrees or plus/minus 15 degrees) were measured in the toe plane 26 as previously mentioned.

The apparatus and method disclosed herein is directed toward an alignment system with a microprocessor or computer 27 contained in a console 28 (FIG. 3 which has the capability of calculating trigonometric relationships and of solving two equations in two unknowns. As shown, the system of FIG. 3 measures individual toe angles for all four suspension wheels as well as camber plane values for caster and camber readings and caster plane values for SAI readings.

A more precise measurement of the steering pivot axis is obtained through the disclosed apparatus and method by allowing an operator to turn the front steerable wheels to an arbitrary steering direction and measuring the steering direction accurately with the toe sensing portions of the alignment heads. The steering direction data is provided to the microprocessor 27. Further, the inclinometer data from the t inclinometers in each alignment head 18 and 19 is taken by the calculator or microprocessor 27. Toe angle measurements can be made for steerable wheels 13 and 14 to accuracies of two-tenths of a degree or less over ranges up to plus and minus fifty degrees of steering. A system operator is unable as a general rule to match a predetermined angle (i.e., plus/minus 10 degrees or plus/minus 15 degrees) within two-tenths of a degree. As a result, the operator error in matching a predetermined angle is eliminated in the disclosed system to thereby improve the accuracy. Further, the time for taking data from which the calculations to be hereinafter described are made is reduced, because the individual front wheels 13 and 14 need not be individually steered to the predetermined angles as mentioned in the description of the prior practice for obtaining the necessary data described herein.

In any overall alignment undertaking for the wheels in the suspension of a vehicle, the steerable wheels 13 and 14 of FIG. 3 are steered straight ahead during that part of the process where measurement of camber and individual toe for each steerable wheel is made. Since that measurement is already made, although for purposes of obtaining individual steerable wheel camber and toe, the resulting data may be used as data from one of the two required arbitrary steering directions for the front steerable wheel pair. Effectively then, the caster and SAI measurement procedure is reduced to taking data at one arbitrary steering direction only which is thereupon utilized with the data taken at the straight ahead steering direction. In summary, one of the two required arbitrary steering directions may be selected as the straight ahead steering direction at which camber and toe measurements are made.

The following geometric relationship exists for a vehicle suspension:

CAMBER−CAMBER OFFSET AT ZERO TOE=CASTER (SIN TOE ANGLE) Camber offset at zero toe is the camber value with the wheels steered straight ahead. If it is at ride height it would be the wheel's camber reading. If it is at elevated position (wheel at full droop), it is the camber value at droop with the wheel steered straight ahead. Turn induced camber change is related to this initial offset. Since toe and camber can always be measured at any steering direction (without steering to a predetermined direction and adjusting each steerable wheel to the predetermined direction prior to taking data) data may be taken at any two arbitrary steering directions and two of the above referenced relationships or equations will exist having two unknowns. The unknowns are camber offset at zero toe and caster, both of which are constant for any given suspension setting. Caster may therefore be calculated. Similarly, for SAI, the following geometric relationship exists:

TIP ANGLE IN PLANE 11−TIP ANGLE IN PLANE 11 AT ZERO TOE=(SAI) (SIN TOE ANGLE)

In this case, SAI & tip angle at Zero toe are constants. Tip angle in plane 11 and toe angle are the variables. By measuring tip angle at two different measured toe angles, the equations may be solved simultaneously and SAI determined. Alternatively, the caster and/or SAI values may be determined from "look-up" tables, such as contained in charts or ROM's.

The toe values should be some angle difference apart to provide adequate accuracy due to compliance in a vehicle suspension which is present by design to absorb road shock and to allow for lack of precision in fitting of parts. It has been found that up to at least a ten degree separation in the two arbitrary steering directions (or one arbitrary steering direction and the straight ahead direction) may be necessary for sufficient accuracy provided by the disclosed apparatus and method. Since the vehicle's geometry and condition of the suspension will effect the amount of turn necessary for an accurate reading, it is suggested that there always be at best 10 degrees between readings, even though less than 10 degrees would be adequate in some cases. In cases where the rear wheel pivot axis is to be determined for rear wheel steering vehicles, steering will likely be limited to 10 degrees or less, so it is desirable in this case to provide for a special condition of small turn angles.

FIG. 2 shows the relationship between toe angle and camber angle for suspensions such as seen in FIG. 3 having different caster angles. The curve shown in dashed lines passing through the zero toe and zero camber values depicts a suspension with a caster value of three degrees. Steering angle stops at approximately plus and minus fifty degrees of steering angle thus restricting the practical portion of FIG. 2 to the area between minus fifty degrees and plus fifty degrees toe angle. A suspension having a caster angle of 7.5 degrees is depicted by the curve 29 in FIG. 2. If camber offset at zero toe exists in the suspension, the curve depicting caster is moved up or down on the graph of FIG. 2. A curve 31 is shown depicting a suspension caster angle of 7.5 degrees wherein one degree camber offset at zero toe exists. Camber reading at zero toe shifts the curve up or down because the curve is always balanced about zero toe since the caster reference plane 12 is defined to be a plane perpendicular to zero toe.

FIG. 4 shows the relationship between SAI angle and the toe angle and the vertical angle sensitive to motion in caster plane 11. In this example, curve 33 represents an SAI angle of 15 degrees with the head tipped two degrees when the wheel is steered straight ahead. In this case, two data points, 34 and 35 would be sufficient to describe this curve. Curve 32 represents the special case where the vertical measurement instrument in plane 11 is level at a condition of zero toe.

Although the best mode contemplated for carrying out the present invention has been herein shown and described, it will be apparent that modification and variation may be made without departing from what is regarded to be the subject matter of the invention.

What is claimed is:

1. In a system for measuring steering pivot axis orientation for either of a pair of steerable wheels supporting a vehicle, wherein said system has cross toe sensors and vertical sensors mounted on the steerable wheels, the improvement comprising means for receiving cross toe measurements and measurements relative to vertical from said sensors at two arbitrary and distinct operator selected steering angles of the pair of steerable wheels, a microprocessor connected to said means for receiving for providing steering axis inclination output, and console means connected to said microprocessor for providing steering axis inclination indicia.

2. In the system of claim 1 wherein said microprocessor provides steering axis inclination output with error due to tip angle in caster plane at zero toe, comprising means for correcting steering axis inclination indicia for tip angle at zero toe.

3. In the system of claim 1 wherein said microprocessor provides steering axis inclination output utilizing the algorithm TIP ANGLE IN CASTER PLANE−TIP ANGLE IN CAMBER PLANE AT ZERO TOE=SAI×SINE TOE ANGLE.

4. In a system for measuring steering pivot axis orientation for either of a pair of steerable wheels supporting a vehicle wherein said system has cross toe sensors and vertical sensors mounted on the steerable wheels, the improvement comprising means for receiving cross toe measurements and measurements relative to vertical from said sensors at two arbitrary and distinct operator selected steering angles of the pair of steerable wheels, read only memory containing steering axis inclination values corresponding to said two arbitrary and distinct vertical and cross toe sensor measurements, said read only memory being connected to said means for receiving and providing steering axis inclination output, and console means connected to said read only memory for providing steering axis inclination indicia.

5. In the system of claim 4 wherein said steering axis inclination output from said read only memory contains error due to tip angle in caster plane at zero toe, comprising means for correcting steering axis inclination indicia for tip angle at zero toe.

6. In a system for measuring steering pivot axis orientation for either of a pair of steerable wheels supporting a vehicle, wherein said system has cross toe sensors and vertical sensors mounted on the steerable wheels, the improvement comprising
   means for receiving cross toe measurements and measurements relative to vertical from said sensors at two arbitrary and distinct operator selected steering angles of the pair of steerable wheels,
   a microprocessor connected to said means for receiving for providing caster output, and console means connected to said microprocessor for providing caster indicia.

7. In the system of claim 6 wherein said microprocessor provides caster output with error due to camber offset at zero toe, comprising means for correcting caster indicia for camber offset at zero toe.

8. In the system of claim 6 wherein said microprocessor provides caster output utilizing the algorithm
   CAMBER ANGLE−CAMBERANGLE AT ZERO TOE=CASTER×SINE TOE ANGLE.

9. In a system for measuring steering pivot axis orientation for either of a pair of steerable wheels supporting a vehicle, wherein said system has cross toe sensors and vertical sensors mounted on the steerable wheels, the improvement comprising
   means for receiving cross toe measurements and measurements relative to vertical from said sensors at two arbitrary and distinct operator selected steering angles of the pair of steerable wheels,
   read only memory containing caster values corresponding to said two arbitrary and distinct vertical and cross toe sensor measurements, said read only memory being connected to said means for receiving and providing caster output, and
   console means connected to said read only memory for providing caster indicia.

10. In the system of claim 9 wherein said caster output from said read only memory contains error due to camber offset at zero toe, comprising means for correcting caster indicia for camber offset at zero toe.

11. In a method for use by an operator of a wheel alignment system for measurement of orientation characteristics of a steering pivot axis for steerable wheels in a vehicle suspension system, wherein the angle of the plane of at least one of the pair of steerable wheels is measured relative to a straight ahead steering direction and relative to vertical in two different steering directions and the steering pivot axis orientation characteristic of the one of the pair of steerable wheels is obtained from the measured angles, the improvement, comprising the steps of
   steering the steerable wheels in a first operator selected arbitrary direction,
   steering the steerable wheels in a second operator selected arbitrary direction, and
   providing indication of the steering pivot axis orientation characteristic to the operator in accordance with the measured angles.

12. The method of claim 11 wherein the step of steering the steerable wheels in a first operator selected arbitrary direction, comprises the step of steering the steerable wheels in a straight ahead direction.

13. The method of claim 11 wherein the step of providing indication comprises the step of indicating the orientation characteristics in a reference table.

14. The method of claim 11 wherein the step of providing indication comprises the step of indicating steering axis inclination of at least one steerable wheel.

15. The method of claim 11 wherein the step of providing indication comprises the step of indicating caster of at least one steerable wheel.

16. The method of claim 11 wherein the step of providing indication comprises the step of indicating the steering pivot axis in space of at least one steerable wheel.

17. The method of claim 11 wherein the difference between the first and second operator selected arbitrary directions is at least ten degrees.

* * * * *